United States Patent
Barker et al.

(10) Patent No.: US 10,648,341 B2
(45) Date of Patent: May 12, 2020

(54) AIRFOIL LEADING EDGE IMPINGEMENT COOLING

(71) Applicant: Rolls-Royce Corporation, Indianapolis, IN (US)

(72) Inventors: Brett J. Barker, Indianapolis, IN (US); Jeffrey F. Rhodes, Zionsville, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 343 days.

(21) Appl. No.: 15/352,020

(22) Filed: Nov. 15, 2016

(65) Prior Publication Data
US 2018/0135424 A1    May 17, 2018

(51) Int. Cl.
*F01D 5/18* (2006.01)
*F01D 9/06* (2006.01)
(Continued)

(52) U.S. Cl.
CPC .......... *F01D 5/186* (2013.01); *F01D 9/065* (2013.01); *F02C 3/04* (2013.01); *F01D 5/147* (2013.01);
(Continued)

(58) Field of Classification Search
CPC ........ F05D 2260/202; F05D 2260/201; F01D 5/186; F01D 5/18; F01D 5/188; F01D 5/189; F01D 5/147; B23P 15/04
(Continued)

(56) References Cited

U.S. PATENT DOCUMENTS

| 2,920,866 A | 1/1960 | Spurrier |
| 3,809,494 A | 5/1974 | Redman |

(Continued)

FOREIGN PATENT DOCUMENTS

| EP | 0742347 | 11/1996 |
| EP | 2 472 062 A1 | 7/2012 |

(Continued)

OTHER PUBLICATIONS

European Search Report, issued in EP Application No. 17196602.1, dated Apr. 17, 2018, pp. 1-11, European Patent Office, Munich, Germany.

(Continued)

*Primary Examiner* — Moshe Wilensky
*Assistant Examiner* — Andrew Thanh Bui
(74) *Attorney, Agent, or Firm* — Brinks Gilson & Lione (57) ABSTRACT

An airfoil including a spar and a cover sheet. Standoffs, a leading edge wall, and a separator wall extend away from an outer surface of the spar. The standoffs are arranged to define leading grooves disposed at the pressure side of the leading edge. The cover sheet is coupled to the leading edge wall and the standoffs over the leading grooves to define cooling passageways. The cooling passageways are in communication with one or more inlet ports formed in the spar, which are in communication with a plenum disposed within the spar. The cover sheet is arranged to define outlet ports or a slot in communication with the cooling passageway. Cooling air is delivered from the cooling air plenum through the inlet port for impingement cooling at the cover sheet, and traverses downstream through the cooling passageway to the outlet ports or slot for film cooling of the leading edge.

12 Claims, 7 Drawing Sheets

(51) Int. Cl.
*F02C 3/04* (2006.01)
*F01D 5/14* (2006.01)
(52) U.S. Cl.
CPC .......... *F01D 5/187* (2013.01); *F05D 2220/32* (2013.01); *F05D 2240/303* (2013.01); *F05D 2260/201* (2013.01); *F05D 2260/202* (2013.01); *F05D 2260/204* (2013.01); *Y02T 50/672* (2013.01); *Y02T 50/676* (2013.01)
(58) Field of Classification Search
USPC ........................................ 415/115; 416/97 R
See application file for complete search history.

(56) References Cited

U.S. PATENT DOCUMENTS

| | | | |
|---|---|---|---|
| 4,543,781 A * | 10/1985 | Rice | F01K 23/10 60/730 |
| 4,676,719 A | 6/1987 | Auxier et al. | |
| 4,887,663 A | 12/1989 | Auxier et al. | |
| 4,992,026 A | 2/1991 | Ohtomo et al. | |
| 5,193,975 A | 3/1993 | Bird et al. | |
| 5,259,730 A * | 11/1993 | Damlis | B23P 15/04 416/96 A |
| 5,383,766 A | 1/1995 | Przirembel et al. | |
| 5,392,515 A | 2/1995 | Auxier et al. | |
| 5,779,438 A | 7/1998 | Wilfert | |
| 6,142,734 A | 11/2000 | Lee | |
| 6,213,714 B1 | 4/2001 | Rhodes | |
| 6,237,344 B1 | 5/2001 | Lee | |
| 6,427,327 B1 | 8/2002 | Bunker | |
| 6,582,186 B2 | 6/2003 | Manzoori et al. | |
| RE39,479 E | 1/2007 | Tressler et al. | |
| 7,258,528 B2 | 8/2007 | Trindade et al. | |
| 8,047,788 B1 | 11/2011 | Liang | |
| 8,047,789 B1 | 11/2011 | Liang | |
| 8,100,654 B1 | 1/2012 | Liang | |
| 8,109,724 B2 | 2/2012 | Malecki et al. | |
| 8,360,726 B1 * | 1/2013 | Liang | F01D 5/187 416/241 R |
| 8,500,405 B1 | 8/2013 | Jones et al. | |
| 8,608,430 B1 | 12/2013 | Liang | |
| 8,858,176 B1 | 10/2014 | Liang | |
| 9,719,362 B2 | 8/2017 | Rana et al. | |
| 10,060,264 B2 | 8/2018 | Moga et al. | |
| 2003/0049127 A1 | 3/2003 | Tiemann | |
| 2003/0175122 A1 | 9/2003 | Zhao et al. | |
| 2005/0031452 A1 | 2/2005 | Liang | |
| 2005/0150632 A1 | 7/2005 | Mayer et al. | |
| 2005/0169759 A1 | 8/2005 | Haubert | |
| 2005/0232769 A1 | 10/2005 | Lee et al. | |
| 2008/0019840 A1 | 1/2008 | Cunha | |
| 2009/0010765 A1 | 1/2009 | Propheter-Hinckley et al. | |
| 2010/0166565 A1 | 7/2010 | Uskert et al. | |
| 2010/0226788 A1 | 9/2010 | Liang | |
| 2010/0247329 A1 | 9/2010 | Morgan | |
| 2010/0284807 A1 | 11/2010 | Tibbott | |
| 2012/0163994 A1 | 6/2012 | Kwon | |
| 2012/0276308 A1 | 11/2012 | Rebak et al. | |
| 2013/0039777 A1 | 2/2013 | Piggush et al. | |
| 2013/0078428 A1 | 3/2013 | Bunker et al. | |
| 2013/0156600 A1 | 6/2013 | Bunker | |
| 2015/0016944 A1 * | 1/2015 | Vandervaart | F01D 5/186 415/1 |
| 2015/0093252 A1 | 4/2015 | Papple | |
| 2015/0300257 A1 | 10/2015 | Vandervaart et al. | |
| 2016/0010465 A1 | 1/2016 | Slavens et al. | |
| 2016/0017736 A1 | 1/2016 | Jenkinson et al. | |
| 2016/0024938 A1 | 1/2016 | Slavens et al. | |
| 2016/0146017 A1 | 5/2016 | Vogel et al. | |
| 2016/0177734 A1 * | 6/2016 | Quach | F01D 5/186 416/1 |
| 2016/0215627 A1 | 7/2016 | Roberge et al. | |
| 2016/0222794 A1 | 8/2016 | Slavens et al. | |
| 2016/0222822 A1 | 8/2016 | Jennings | |
| 2016/0251974 A1 | 9/2016 | Slavens et al. | |
| 2017/0022821 A1 | 1/2017 | Ferber et al. | |
| 2017/0030199 A1 | 2/2017 | Barker et al. | |
| 2017/0175534 A1 | 6/2017 | Ferber et al. | |
| 2017/0211395 A1 | 7/2017 | Heffernan et al. | |
| 2018/0073390 A1 | 3/2018 | Varney | |
| 2018/0128111 A1 | 5/2018 | Koenig et al. | |
| 2018/0135426 A1 | 5/2018 | Barker et al. | |
| 2018/0156043 A1 | 6/2018 | Clum et al. | |
| 2018/0163554 A1 | 6/2018 | O'Leary | |
| 2018/0202295 A1 | 7/2018 | Rhodes et al. | |
| 2018/0230833 A1 | 8/2018 | Kush | |
| 2018/0274377 A1 | 9/2018 | Kington et al. | |
| 2018/0320525 A1 | 11/2018 | Clum et al. | |
| 2019/0032493 A1 | 1/2019 | Barker et al. | |

FOREIGN PATENT DOCUMENTS

| | | |
|---|---|---|
| EP | 3124747 | 2/2017 |
| EP | 3 321 474 A1 | 5/2018 |
| EP | 3 335 873 A1 | 6/2018 |
| EP | 3 438 411 A1 | 2/2019 |

OTHER PUBLICATIONS

U.S. Appl. No. 15/214,799, filed Jul. 20, 2016, pp. 1-36, entitled "Turbine Airfoils With Micro Cooling Features," filed with the U.S. Patent and Trademark Office, Alexandria, VA.
Notice of Allowance, dated May 6, 2019, pp. 1-8, issued in U.S. Appl. No. 15/352,071, U.S. Patent and Trademark Office, Alexandria, VA.
Notice of Allowance, dated Jun. 11, 2019, pp. 1-22, issued in U.S. Appl. No. 15/664,996, U.S. Patent and Trademark Office, Alexandria, VA.
J.E. Kingery et al., "An Analysis of a Deposition Tolerant Cooling Approach for Nozzle Guide Vanes," Proceedings of ASME Turbo Expo 2015: Turbine Technical Conference and Exposition, dated Jun. 15, 2015, pp. 1-11, published by the American Society of Mechanical Engineers, Montréal, Canada.
P. M. Ligrani et al., "Film-Cooling From Holes With Compound Angle Orientations: Part 2—Results Downstream of a Single Row of Holes With 6d Spanwise Spacing," Transactions of the ASME, Journal of Heat Transfer, dated May 1994, pp. 353-362, vol. 116, No. 2, published by the American Society of Mechanical Engineers, New York, NY.
D. L. Schmidt, "Film Cooling With Compound Angle Holes: Adiabatic Effectiveness," Transactions of the ASME, Journal of Turbomachinery, dated Oct. 1996, pp. 807-813, vol. 118, No. 4, published by the American Society of Mechanical Engineers, New York, NY.
J. L. Stollery et al., "A Note on the Use of a Boundary-Layer Model for Correlating Film-Cooling Data," International Journal of Heat and Mass Transfer, dated Jul. 3, 1964, pp. 55-65, vol. 8, published by Pergamon Press, Great Britain.
Extended European Search Report, issued in European Patent Application No. 18168123.0, dated Oct. 31, 2018, pp. 1-12, European Patent Office, Munich, Germany.
U.S. Notice of Allowance, dated Mar. 5, 2019, pp. 1-14, issued in U.S. Appl. No. 15/352,071, U.S. Patent and Trademark Office, Alexandria, VA.

* cited by examiner

AIRFOIL LEADING EDGE IMPINGEMENT COOLING

TECHNICAL FIELD

The present disclosure relates generally to gas turbine engines, and more specifically to airfoils used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Modern gas turbine engines produce high gas temperature environments that are typically above the melting temperature of the internal hardware. In order to survive in these conditions, turbine hardware typically uses a combination of cooling mechanisms to maintain an acceptable temperature. These mechanisms may include film cooling, thermal barrier coatings (TBC), and internal cooling devices. The stagnation point of the leading edge of an airfoil is an area that may experience the highest gas pressure and highest thermal loads exerted against the airfoil. The zone around the stagnation point is therefore a difficult region to cool due to reduced film effectiveness and potential blockage with debris at outlet ports because of the high gas pressure. Film cooling may be costly in terms of stage efficiency, especially in high Mach regions, and large volumes of cooling air may be required for present internal cooling devices. Thus, a need exists for improved devices and methods for airfoil cooling.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Disclosed herein are examples of cooling arrangements for dual-wall airfoil configurations. The airfoils may be used in gas turbine engines and combustion systems that may be used in any industry, such as, for example, to power aircraft, watercraft, power generators, and the like. One or more outlet or discharge ports or a cooling slot may be defined at the leading edge, and cooling passageways or channels are disposed along the leading edge in the direction of the pressure side. The cooling arrangements in the airfoil may overcome film lifting and improve downstream film cooling along the stagnation point region of the leading edge in the direction of the pressure side. With the hot gas pressure lower downstream, more cooling flow is allowed to be directed to the leading edge for more cooling effectiveness. Shielding of the suction side discharge from blockage may be improved when debris in the hot gas path is more likely to hit the leading edge and the pressure side. The channel arrangement and inlet impingement port configuration may allow for impingement cooling along the interior cover sheet and along the stagnation point region of the leading edge in the pressure side direction.

Figure 1:
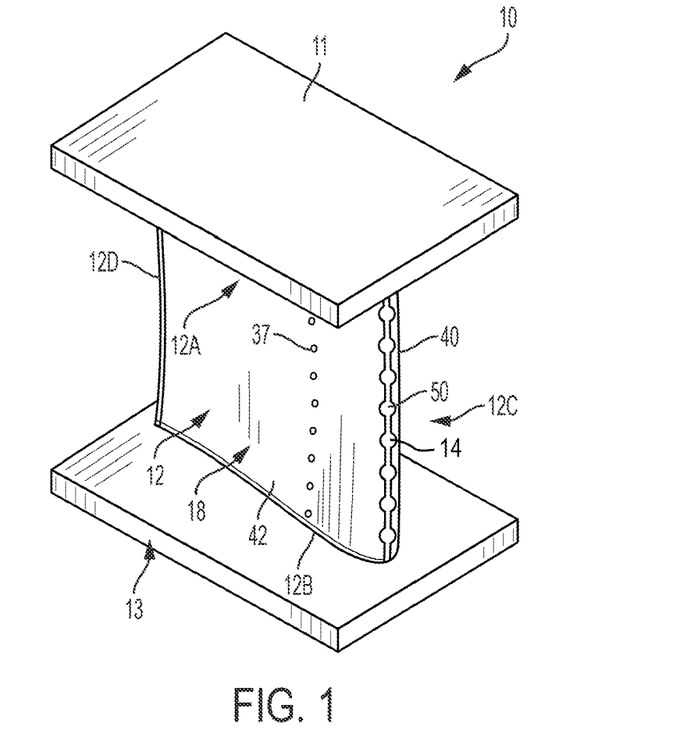
FIG. 1 is a perspective view of an example of an airfoil coupled to a pair of endwalls.

FIG. 1 shows an example of a blade 10 of a gas turbine engine. The blade 10 includes a radially outer endwall 11, a radially inner endwall 13, and an airfoil 12 coupled between the outer and inner endwalls 11, 13. The outer endwall 11 is configured to support a tip 12A of the airfoil 12 between a leading edge 12C and a trailing edge 12D of the airfoil 12, and the inner endwall 13 is configured to support a base 12B of the airfoil 12 between the leading and trailing edges 12C, 12D. Leading edge outlet ports 14 are shown disposed along the leading edge 12C. In an example, the blade 10 is a turbine blade in a turbine section of the gas turbine engine, as described below, and configured to rotate about a central axis of the engine, with the base 12B of the airfoil being in closer proximity to the central axis than the tip 12A. In another example, the blade 10 is part of a static vane assembly in a turbine section of the gas turbine engine, as described below. The blade 10 may include a dovetail-shaped root coupled to the airfoil 12 for connecting the blade 10 to a disk for rotation about a central axis of the engine.

Figure 2:
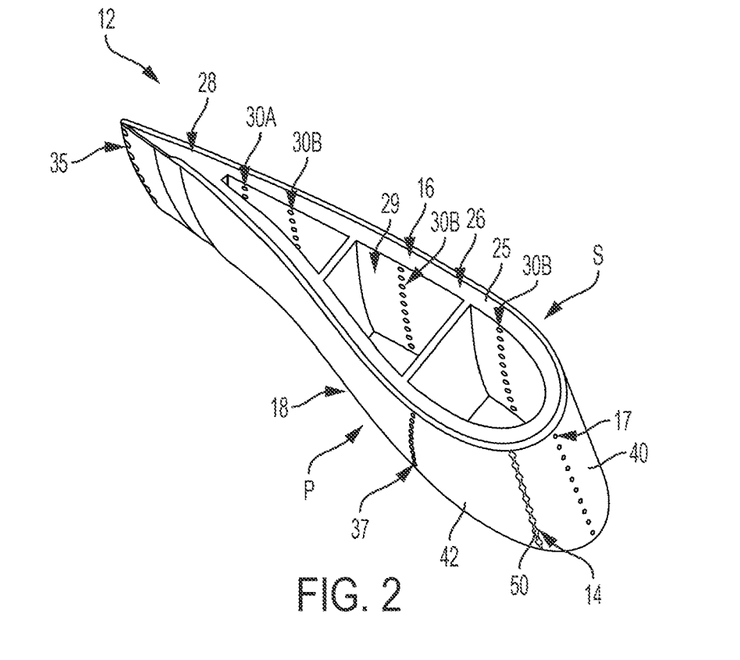
FIG. 2 is a perspective view of the airfoil of FIG. 1 without the endwalls, depicting an interior of the airfoil.

As shown in FIG. 2, the airfoil 12 is shaped to define a suction side S and a pressure side P.

Figure 3:
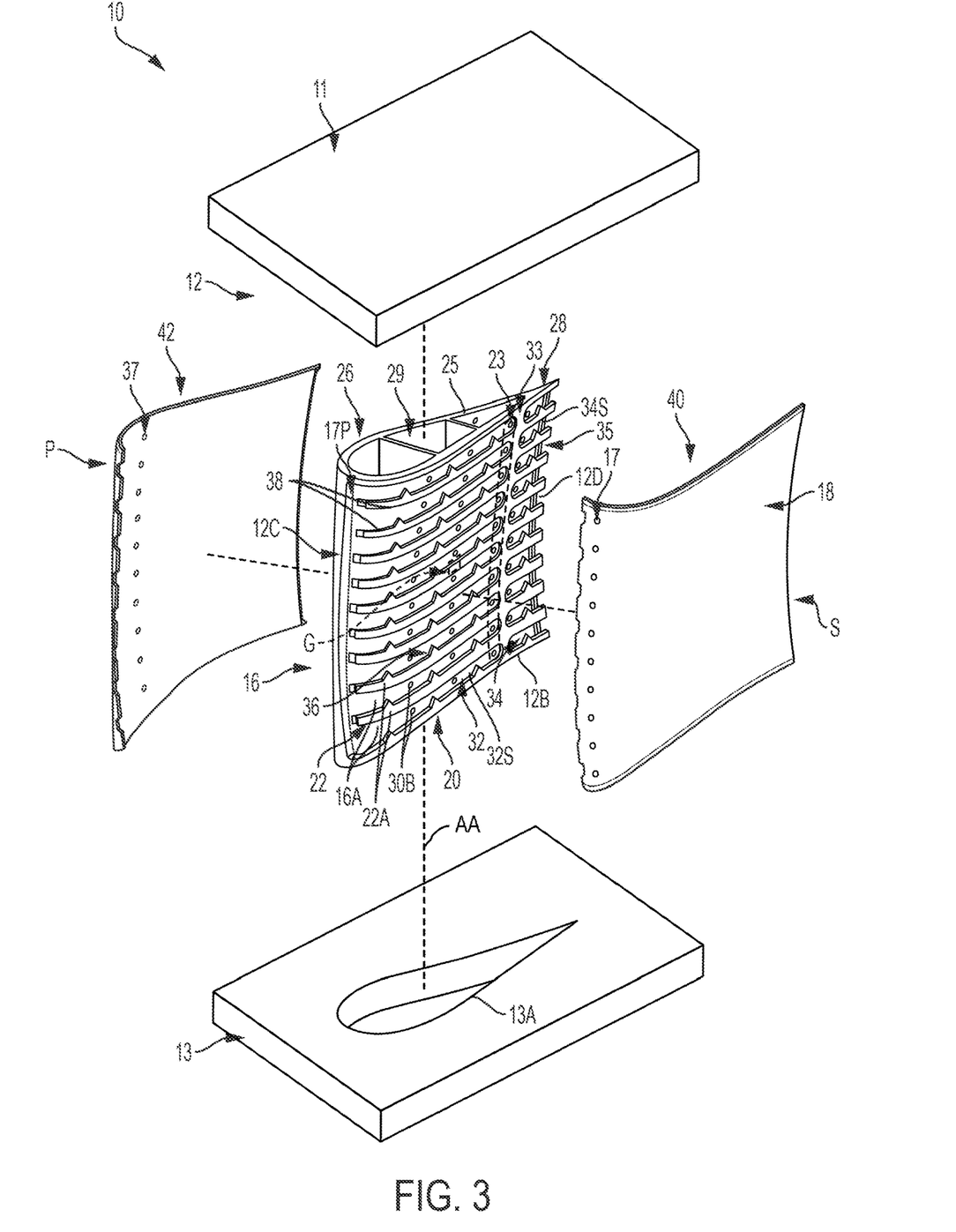
FIG. 3 is an exploded assembly view of the airfoil of FIG. 1.

With additional reference to FIG. 2, the airfoil 12 includes an internal spar 16 disposed along an airfoil axis AA (FIG. 3) and an external cover sheet 18 coupled to the spar 16, such as metallurgically bonded to the spar 16 or spar features as described below, making the airfoil 12 sometimes referred to as a dual-wall airfoil. In FIG. 3, the airfoil axis AA extends radially perpendicular to the central axis of the engine.

As shown in FIG. 3, the spar 16 may be formed to include a plurality of grooves 20 to define a plurality of cooling passageways disposed between the spar 16 and the cover sheet 18. The grooves 20 are spaced along the spar 16 with the standoffs 22 separating the grooves 20. The standoffs 22 protrude outwardly relative to the outer surface 16A of the spar 16 that defines an aspect of the grooves 20. FIG. 3 shows a pattern of grooves 20 in an elongation row configuration extending between the leading edge 12C and the trailing edge 12D and disposed radially spaced from another relative to the central axis and along the airfoil axis AA. The grooves 20 may have other configurations such as portions running in the direction of the tip 12A and/or the base 12B. The cover sheet 18 is coupled to an outer surface 22A of the standoffs 22 with respect to the spar 16 and spaced from the outer surfaces 16A lining the grooves 20, thereby forming the cooling passageways. A flow of cooling air passing through one cooling passageway may be separated from a flow of cooling air passing through an adjacent cooling passageway by the standoffs 22.

FIGS. 2-3 depict the spar 16 including a spar wall 25 defining a body section 26 and a tail section 28 of the spar 16. The spar wall 25 is disposed to define a cooling air plenum 29 along the airfoil axis AA within the hollow spar. The cooling air plenum 29 is adapted to receive a flow of cooling air for delivery to the plurality of grooves 20 via a plurality of inlet ports (shown as inlet ports 30A, 30B, 30C, 30A', 30B') defined by the spar wall 25. The flow of cooling air may be supplied through one or more of the outer and inner endwalls 11, 13 of the blade 10. In another example, the flow of cooling air may be supplied through a dovetail-shaped root coupled to the airfoil 12. In an example, the inner endwall 13 includes a central conduit 13A defined therein which is in fluid communication with the cooling air plenum 29 within the airfoil 12. Extending below the inner endwall 13 may be a hollow shank portion (not shown) in communication with the central conduit 13A and coupled to an internal engine passageway for receiving cooling air from the compressor and distributing the cooling air within the cooling air plenum 29 of the airfoil 12.

Figure 4:
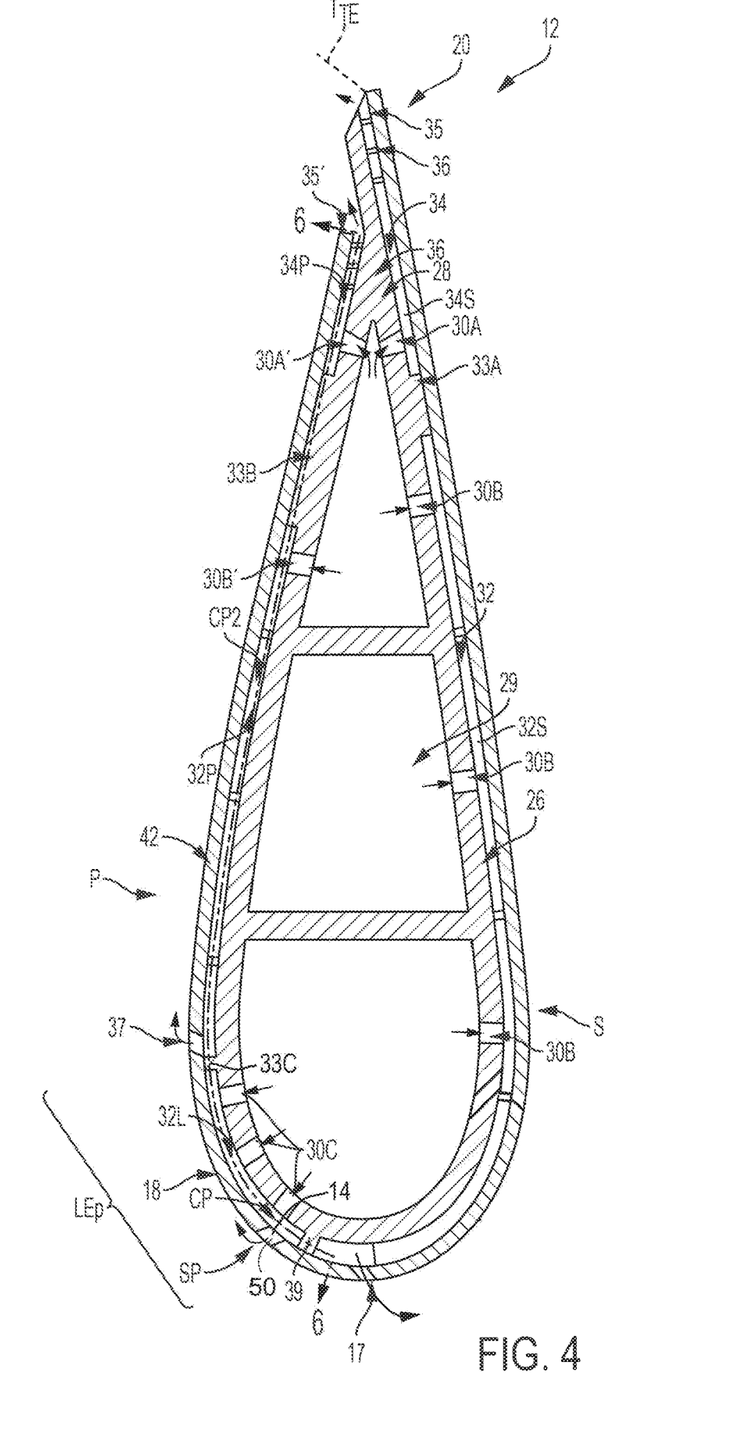
FIG. 4 is a cross-sectional view of the airfoil of FIG. 1.
Figure 6:
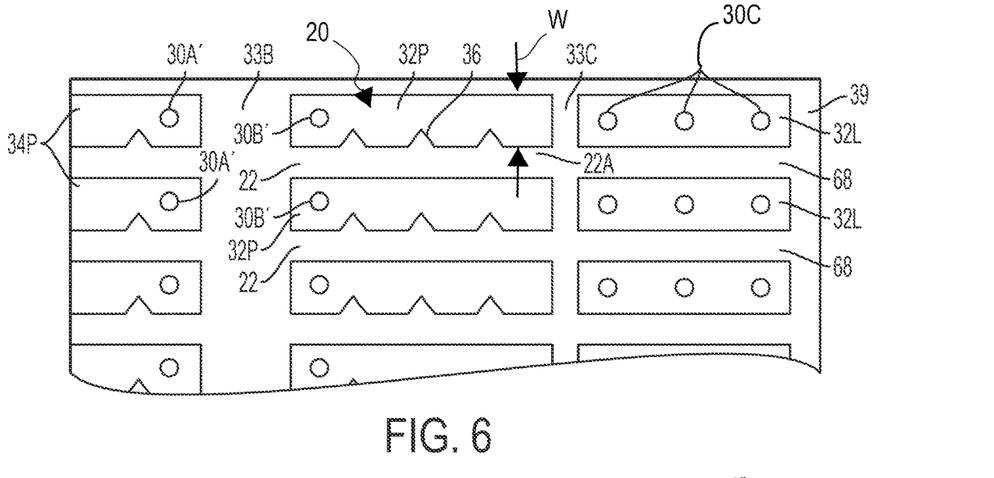
FIG. 6 is a cross-sectional view taken along line 6-6 in FIG. 4, depicting the arrangement of standoffs and leading edge wall.

With reference to FIGS. 3-4, the plurality of grooves 20 may include a plurality of body section grooves 32 and/or a plurality of tail section grooves 34. As may be appreciated by one of ordinary skill in the art, the grooves 32, 34 are shown being formed in the suction side S of the spar 16 (will now be referred with "S" following the reference numeral), may also be formed in the pressure side P of the spar 16 (will now be referred with "P" following the reference numeral), as shown in FIG. 6.

A first trailing separator wall 33A may be disposed along the suction side S between the body section grooves 32S and the tail section grooves 34S such that a flow of cooling air passing through the body section grooves 32S is separated from a flow of cooling air passing through the tail section grooves 34S. A second trailing separator wall 33B may be disposed along the pressure side P between the body section grooves 32P and the tail section grooves 34P such that a flow of cooling air passing through the body section grooves 32P is separated from a flow of cooling air passing through the tail section grooves 34P. The tail section grooves 34S extend between a first tail portion 30A of the inlet ports and an exit slot 35, downstream of the first tail portion inlet ports 30A. The tail section grooves 34P extend between a second tail portion 30A' of the inlet ports and a trailing outlet slot 35', downstream of the second tail portion inlet ports 30A'. The exit slot 35 and/or the trailing outlet slot 35' may be defined between the spar 16 and the cover sheet 18.

The standoffs 22 are shown having elongated shape to define elongate channels. The standoffs 22 defining the body section grooves 32S and/or 32P and the tail section grooves 34S and/or 34P may have other configurations than illustrated in the figures. For example, the standoffs 22 may comprise a plurality of pedestals, columns, or pins or combination of variously sized elongated members and/or pedestals, columns, or pins. The pedestals, columns or pins may have various cross-sectional shapes, including rectangular, diamond, circular or semi-circular, as well as other shapes.

The body section grooves 32S extend between a first body portion 30B of the inlet ports at the suction side S and to a plurality of first body portion outlet ports 17, which are upstream of the first body portion inlet ports 30B. The first body portion outlet ports 17 are defined by the suction-side panel 40 along the leading edge. The first body portion outlet ports 17 may be oriented toward the suction side to provide film cooling along the airfoil surface. The leading edge wall 39 is disposed between the first body portion outlet ports 17 and the leading edge outlet ports 14. An intermediate portion corresponding to cooling passageways CP2 defined by the body section grooves 32P to provide cooling along the outside boundary of the panel. The body section grooves 32P extend between a second body portion 30B' of the inlet ports at the pressure side and to a plurality of second body portion outlet ports 37, which are upstream of the second body portion inlet ports 30B'. A gap G may be formed in the standoffs 22 and/or the separator walls 33A, 33B, 33C to allow the flows of cooling air in the grooves to transfer between the adjacent respective grooves. The body section grooves 32S extend between the first body portion inlet ports 30B and an outlet-port internal plenum 17P disposed along a leading edge wall 39 where the flow of cooling air is distributed to the first body portion outlet ports 17 formed through the suction-side panel 40 as shown in FIG. 4. The leading edge wall 39 is disposed between the first body portion outlet ports 17 and the leading edge outlet ports 14.

A leading separator wall 33C may be disposed to divide the body section grooves 32P into further groove arrays, as illustrated. The leading separator wall 33C may be disposed to divide the body section grooves 32S into further groove arrays. The leading separator wall 33C may be disposed away from the leading edge wall 39 in a pressure side direction to divide the body section grooves 32P into a plurality of body section leading grooves 32L that is closer in proximity to the leading edge than a plurality of body section grooves 32P that is closer in proximity to the trailing edge. The body section leading grooves 32L extend between a third body portion 30C of the inlet ports and to the leading edge outlet ports 14, which are upstream of at least a portion of the third body portion inlet ports 30C. FIG. 3 depicts the leading edge wall 39 defined between the body section grooves 32P of the pressure side P and the body section grooves 32S of the suction side S. The separator walls 33A, 33B and/or 33C and/or the leading edge wall 39 may protrude at a similar distance as the standoffs 22 and axially extend along the airfoil axis AA at least partially, and in some examples, fully, from the base 12B and to the tip 12A.

The stagnation point SP may be located along any point of the leading edge 12C. To this end, the leading edge outlet ports 14 are shown disposed along the pressure side P, but may be disposed along the suction side S or closer to the center of the leading edge 12C. The leading edge wall 39 may be disposed at the suction side with the body section grooves 32L extending from the pressure side and across the center of the leading edge to the suction side. Alternatively, the leading separator wall 33C may be disposed to divide the body section grooves 32S into further groove arrays. The leading separator wall 33C may be disposed away from the leading edge wall 39 in a suction side direction to divide the body section grooves 32S into the plurality of body section leading grooves 32L that is closer in proximity to the leading edge than the plurality of body section grooves 32S that is closer in proximity to the trailing edge. Like the body section leading grooves 32L shown in FIG. 6, the grooves 32L formed at the suction side may extend between the third body portion 30C of the inlet ports and to the leading edge outlet ports 14.

Figure 7:
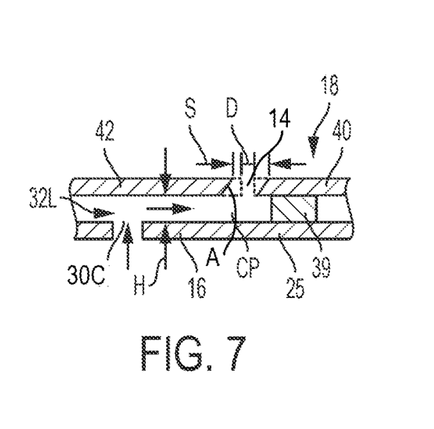
FIG. 7 is a cross-sectional view taken along line 7-7 in FIG. 5.

The cooling passageways may be sized to define microchannels. For example, a width W of the grooves 20 is defined between adjacent standoffs 22 as representatively shown by body section grooves (such as grooves 34P, 32P, 32L in FIG. 6). In an example, the width W of the grooves 20 may be 0.02 inches, 0.05 inches, or any size therebetween. Similarly, a height H of the grooves 20 or depth of the cooling passageways is defined between the spar 16 and the cover sheet 18, as shown in FIG. 7. In one example, the height H of the grooves 20 is 0.015 inches, 0.035 inches, or any size therebetween. A length L of the standoffs 22 is defined across the spanning width of the standoffs in the same direction as the width W of the grooves.

The standoffs 22 defining the grooves 20 may include at least one turbulator 36. The use of turbulators 36 enables increased cooling performance by facilitating the mixing of cooling air flow and reducing the amount of cooling air needed to cool the blade 10. The grooving facing surfaces 38 form the upright walls of the standoffs 22. The turbulators 36 are shown disposed along grooving facing surfaces 38 of the standoffs 22 and extending away from the groove facing surfaces 38 into the regions of the grooves 20. In one example, in addition to or instead of the outwardly extending turbulators, the turbulators 36 may also be formed as recesses, or inwardly facing, formed into the groove facing surfaces 38 of the spar 16. The extension or recess of the turbulators 36 may be 0.003 inches, 0.007 inches, or any size therebetween.

In FIGS. 2-3, the cover sheet 18 is shown including a suction-side panel 40 and a pressure-side panel 42. The suction-side panel 40 may be coupled to the outer surface 22A of the standoffs 22 of the suction side S of the spar 16 to at least partially cover the grooves 32, 34 for defining the cooling passageways. Similarly, the pressure-side panel 42 may be coupled to the outer surface 22A of the standoffs 22 at the pressure side P of the spar 16. The panels 40, 42 may be a thin walled member, having a wall thickness in the range, such as, for example, about 0.015 inches to 0.025 inches. The pressure-side panel 42 and the suction-side panel 40 may be arranged relative to one another to define a leading edge slot 50, as shown in FIGS. 1-2. The standoffs 22 may be extended beyond a leading end 52 of the pressure-side panel 42 toward the leading edge wall. The standoffs 22 may transverse the leading edge slot 50 and extend to the leading edge wall. This intersection of the leading edge slot 50 by the standoffs 22 define the boundary of the leading edge outlet ports 14 between the standoffs 22 and ends of the panels 40, 42.

Figure 5:
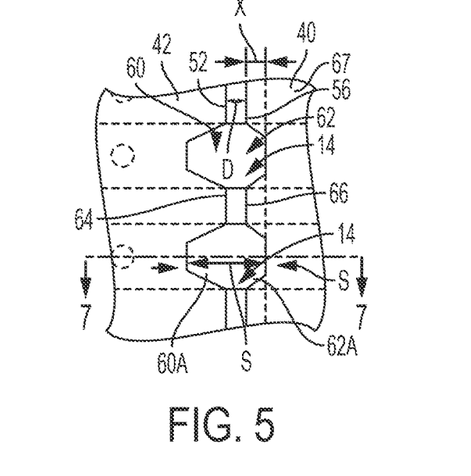
FIG. 5 is a detail view of a leading edge of the airfoil in FIG. 1.

With additional reference to FIGS. 5 and 7, the leading end 52 of the pressure-side panel 42 may be arranged adjacent to a confronting leading end 56 of the suction-side panel 40. In one example, the leading end 52 of the pressure-side panel 42 and the leading end 56 of the suction-side panel 40 are in a contacting relationship. In another example, the leading end 52 of the pressure-side panel 42 and the leading end 56 of the suction-side panel 40 may be spaced from one another by a distance D. The distance D shown between the panels in the figures is for illustrative purpose and should not be limiting. The distance D may be based on the desired mount of air flow needed. The distance D may also accommodate thermal expansion of the panels and/or manufacturing assembly tolerances. The leading end 52 and the leading end 56 may be beveled at an angle A as shown in FIG. 7. The beveling of the leading ends 52, 56 may orient the leading edge outlet ports 14 in a desired direction. For example, the direction may be toward the pressure-side to provide film cooling along the airfoil surface at a leading edge pressure side zone LEP. The LEP zone may be defined between the stagnation point SP and the second body portion outlet port 37 along the pressure-side. Of course, when cooling is desired between the stagnation point SP and the suction side, a similar leading edge pressure side zone may also be defined. For example, the desired direction from the beveled leading ends may be toward the pressure-side and/or the suction-side, and/or radially along the slot in the direction toward the airfoil tip and/or the airfoil base, or any combination thereof to provide film cooling along the airfoil surface. Body section leading grooves 32L are disposed across the LEP zone between the leading separator wall 33C and the leading edge wall 39.

The leading end 52, the leading end 56, or both, may have a notched arrangement to define aspects of the leading edge outlet ports 14 along the leading edge slot 50. In an example, the pressure-side panel 42 includes a series of first notches 60 defined in the leading end 52, and the suction-side panel 40 includes a series of second notches 62 defined in the leading end 56. Each of the first notches 60 may be radially spaced from the adjacent first notch by a series of first bridges 64. Each of the second notches 62 may be radially spaced from the adjacent second notch by a series of second bridges 66. The leading edge outlet ports 14 are defined by at least one of the first notches 60 and at least one of the second notches 62. In an example, a pair of confronting first and second notches 60, 62 defines one of the leading edge outlet ports 14. For example, the first and second notches 60A, 62A are disposed across the leading edge slot 50 from one another in a confronting and aligned relationship. To this end, the first bridges 64 and the second bridges 66 may be sized accordingly to place the first and second notches 60, 62 across from one another. The size of the first and second bridges 64, 66 is shown as being a constant size. In alternative examples, the size of the first and second bridges 64, 66 may vary in size so long as the first and second notches 60, 62 are disposed across from another. The depth of the first and second notches 60, 62 that define the leading edge outlet ports 14 have a spacing S in between the notches that is greater than the distance D. The distance D between the panels may be minimal such that the leading end 52 and the leading end 56 of the panels may be adjacent to one another. The leading ends 52, 56 may be adjacent to one another in a contacting relationship or spaced from one another by the distance D up to 0.02 inches or more. Alternatively, the leading ends 52, 56 may be coupled to one another to form an overlapping lap joint.

FIG. 6 is a side view of the spar 16 at the pressure side, with the pressure-side panel 42 and the suction-side panel 40 of the cover sheet 18 removed. The standoffs 22 are shown as discrete and extending to the leading edge wall 39 to separate the flow of cooling air in adjacent body section leading grooves 32L. In an example, the standoffs 22 are disposed radially from another relative to the central axis of the engine, extending in a direction transversing the axial direction of the leading edge wall 39 and the separator walls 33B, 33C. The transverse direction includes a direction orthogonal to the airfoil axis AA as well as up to 45 degrees relative to the airfoil axis. Third body portion 30C of the inlet ports are shown defined in the outer surface 16A disposed between the standoffs 22 where the body section leading grooves 32L are located. In an example, each of the standoffs 22 includes a leading end 68 coupled to the standoffs 22.

Turning back to FIG. 5, the leading edge outlet ports 14 are shown disposed in an overlapping relationship with the body section leading grooves 32L. In other words, the first notches 60 and the second notches 62 are shown overlapping the body section leading grooves 32L. The first and second bridges 64, 66 are shown overlapping the standoffs 22. In an example, the first and second bridges 64, 66 may have a length corresponding to the length L of the respective standoffs 22. The suction-side panel 40 may be disposed extending beyond the leading edge wall 39 in the pressure side P direction to define an overhang portion 67. In this manner, the suction-side panel 40 may be coupled to the respective outer surfaces of the leading edge wall 39 and a portion of the standoffs 22 along the suction side. The pressure-side panel 42 may be disposed spaced from the leading edge wall 39 and coupled to the outer surfaces of the standoffs 22 along the pressure side. The leading edge outlet ports 14 are shown being sized to span the width W of the grooves. Alternatively, the leading edge outlet ports 14 may be sized smaller than the width W or larger than the width W. Alternatively, more than one leading edge outlet ports 14 may occupy the width of a single groove.

FIG. 7 illustrates a cross-sectional view of FIG. 5 taken along lines 7-7, depicting the relative distance between the spar 16 and the pressure-side panel 42 and the suction-side panel 40 of the cover sheet 18. The panels 40, 42 of the cover 18 are shown disposed over the body section leading grooves 32L for defining the cooling passageways CP in fluid communication with the leading edge outlet ports 14 and the third body portion 30C of the inlet ports. The flow of cooling air is delivered from the cooling air plenum 29 to the body section leading grooves 32L via the third body portion 30C of the inlet ports for cooling impingement against the pressure-side panel 42 of the cover sheet 18. The flow of cooling air then travels down the body section leading grooves 32L and exits the body section leading grooves 32L via the leading edge outlet ports 14 at the leading edge slot 50.

The number of third body portion 30C of the inlet ports along each of the body section leading grooves 32L may be one, two, three (shown) or more. Additional inlet ports may provide better distribution of impingement cooling of the cover sheet. FIG. 4 illustrates all of the third body portion 30C of the inlet ports located upstream of the location of the leading edge outlet ports 14 such that the cooling air flow runs upstream to exit the leading edge outlet ports 14. Alternatively, the location of the leading edge outlet ports 14 may be disposed between adjacent third body portion 30C of the inlet ports such that the cooling air flow runs upstream and downstream to exit the leading edge outlet ports 14. The body section leading grooves 32L may also be referred to as microchannels, which may not include any turbulators. The body section leading grooves 32L may be configured as a linear path to minimize the pressure losses of the flow of cooling air within the grooves. To this end, there is minimal pressure drop from the flow of cooling air within the plenum to the leading outlet ports. A higher pressure cooling air at the leading outlet ports may reduce the potential for high gas ingestion into the airfoil and the potential for debris into the airfoil through the leading outlet ports, thereby improving the cooling efficiency along the leading edge at the leading edge pressure side zone LEP. A higher pressure cooling air at the leading outlet ports may increase the film cooling downstream of the leading outlet ports along the leading edge at the leading edge pressure side zone LEP.

Figure 8:
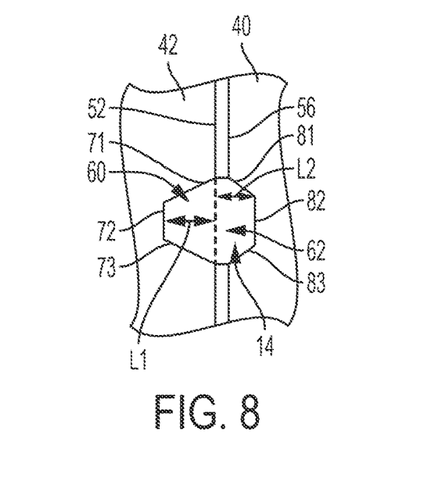
FIG. 8 is a detail view of an example of a notch arrangement of the airfoil in FIG. 1.

FIG. 8 depicts an example shape of the first notch 60 and an example shape of the second notch 62. The first notch 60 may be defined by three walls: a first wall 71, a second wall 72, and a third 73. The first and third walls 71, 73 may be inclined toward the second wall 72 that is disposed at a first depth L1 from the leading end 52 to define a tapered notch. The second wall 72 may be in parallel with the leading end 52. The second notch 62 may be defined by three walls: a first wall 81, a second wall 82, and a third 83. The first and third walls 81, 83 may be inclined toward the second wall 82 that is disposed at a second depth L2 from the leading end 56 to define a tapered notch. The second wall 82 may be in parallel with the leading end 56.

Figure 9:
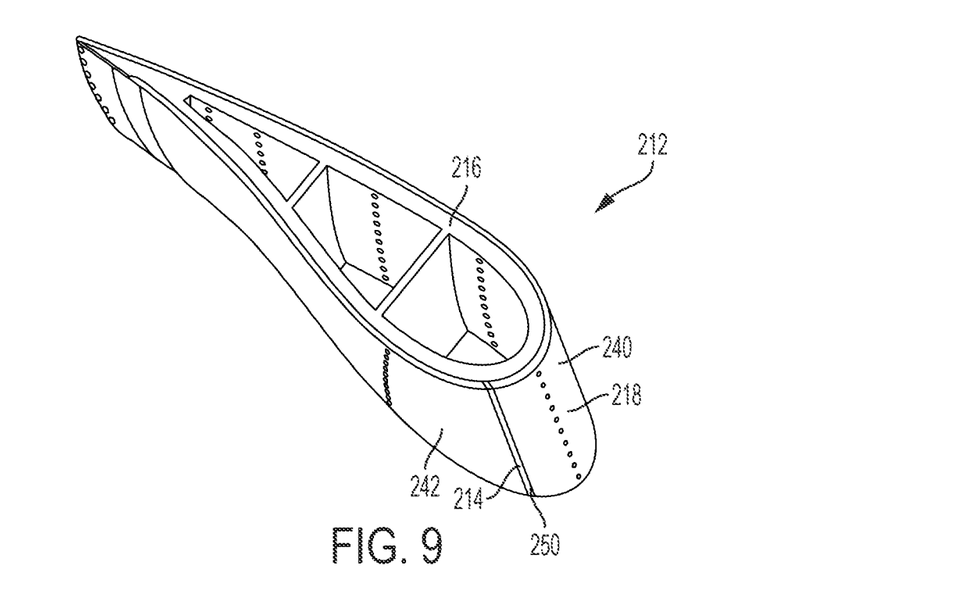
FIGS. 9-10 depict other examples of airfoils, respectively.
Figure 10:
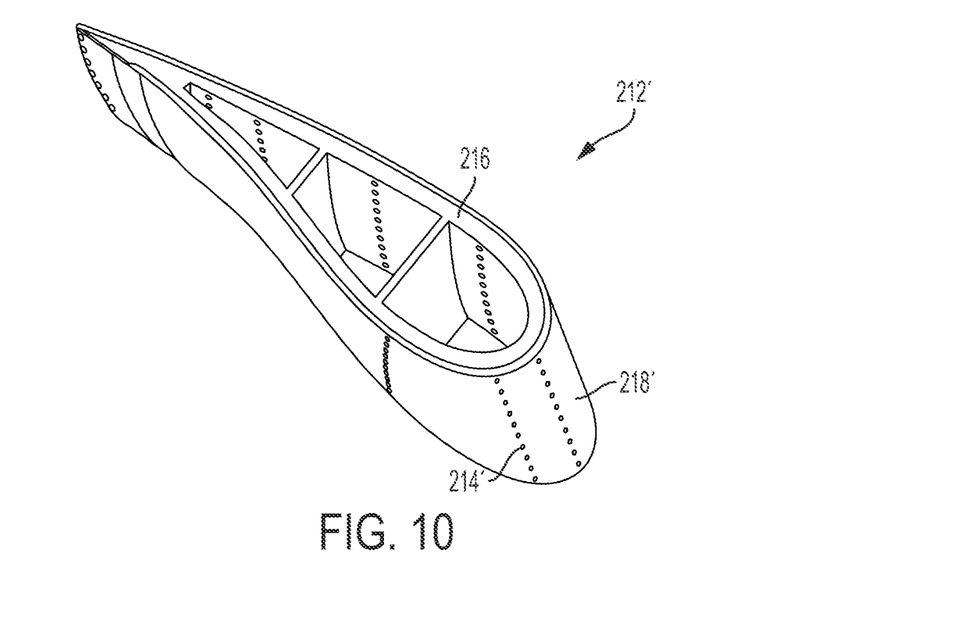
Figure 11:
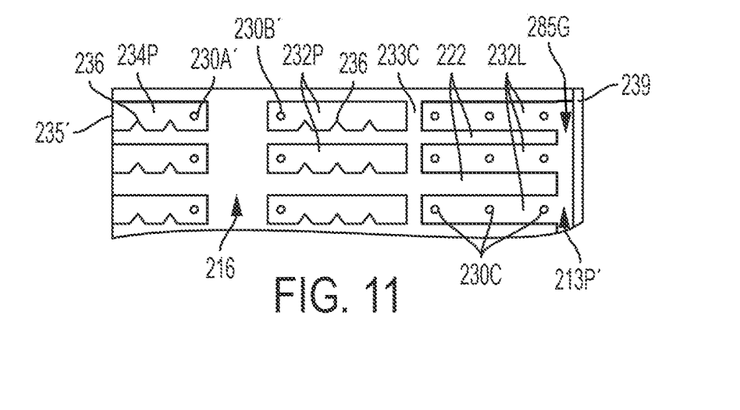
FIG. 11 depicts a partial pressure-side view of another example of a spar, provided with the airfoils of FIGS. 9-10.

FIGS. 9-10 depict other examples of dual wall airfoils 212, 212', respectively, having features described with respect to the airfoil 12, with the spar 216 shown in FIG. 11. The airfoils 212, 212' may benefit from the higher pressure cooling air at the leading outlet ports for improving the cooling efficiency along the leading edge at the leading edge pressure side zone LEP. The airfoil 212 includes the cover sheet 218 in the form of the pressure-side panel 242 and the suction-side panel 240 arranged to define the leading edge continuous slot 250. The airfoil 212' includes the cover sheet 218' shaped and sized to fit around the leading edge of the spar 216, with the series of leading outlet ports 214' defined by the cover sheet 218'.

FIG. 11 is a side view of the spar 216 at the pressure side, with the cover sheet 218 or 218' removed. The standoffs 222 are shown extending in a transverse direction toward the leading edge wall 239, with the end 269 of the standoffs 222 being spaced from the leading edge wall 239 to define a plenum gap 285G therebetween. The body section grooves 232L extend between the third portion 230C of the inlet ports and the outlet-port internal plenum 213P' where the flow of cooling air is distributed to the leading outlet ports formed through the cover sheet 218 or 218' as will be described. The body section grooves 232P are separated from the body section grooves 232L by the leading separator wall 233C. The body section grooves 232P are separated from the tail section grooves 234P by the separator wall 233B such that a flow of cooling air passing through the body section grooves 232P from the cooling air plenum via the second body portion inlet ports 230B' is separated from a flow of cooling air passing through the tail section grooves 234P from cooling air plenum via the second tail portion inlet ports 230A'. The tail section grooves 234P extend between the second tail portion 230A' of the inlet ports and the trailing outlet slot 235', downstream of the second tail portion inlet ports 230A'. The trailing outlet slot 235' may be defined between the spar 216 and the cover sheet 218. Turbulators 236 may be disposed, as shown, along the groove facing surfaces.

Figure 12:
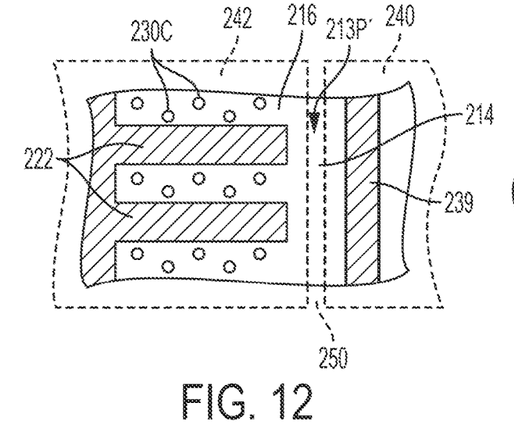
FIG. 12 is a detail view of a leading edge of the airfoil of FIG. 9.

FIG. 12 depicts the airfoil 212 including the spar 216 with the cover sheet the pressure-side panel 242 and the suction-side panel 240 (shown in dashed lines) in place. The suction-side panel 240 may be coupled to the respective outer surfaces of the leading edge wall 239 and a portion of the standoffs 222 along the suction side. The pressure-side panel 242 may be disposed spaced from the leading edge wall 239 and coupled to the outer surfaces of the standoffs 222 along the pressure side. The outlet port 214 in the form of the leading edge slot 250 may be disposed over the outlet-port internal plenum 213P'.

Figure 13:
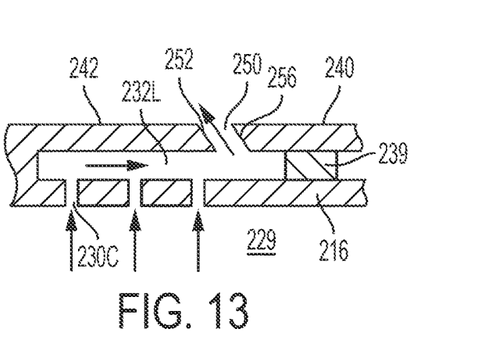
FIG. 13 is a cross-sectional view taken along line 13-13 in FIG. 12.

FIG. 13 depicts the flow of cooling air delivered from the cooling air internal plenum 229 to the body section grooves 232L via the third body portion 230C of the inlet ports (with five ports/groove shown in a staggered pattern) for impingement cooling of the pressure-side panel 242 of the cover sheet 218. The flow of cooling air then travels down the grooves 232L and exits the grooves 232L via the leading edge slot 250. The leading ends 252, 256 of the panels 240, 242 may be beveled to direct the cool air flow toward the pressure side.

Figure 14:
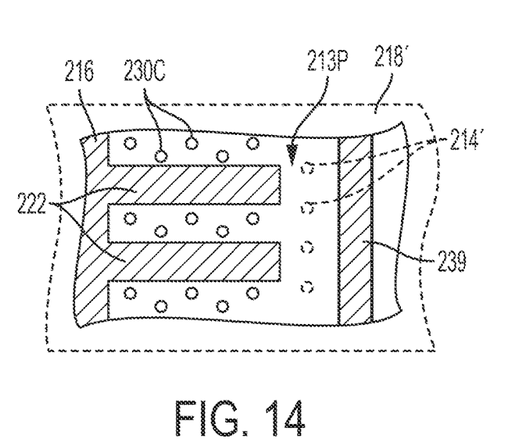
FIG. 14 is a detail view of a leading edge of the airfoil of FIG. 10.
Figure 15:
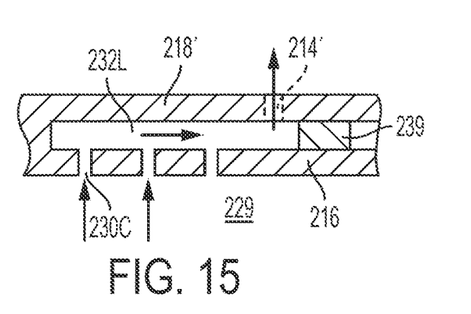
FIG. 15 is a cross-sectional view taken along line 15-15 in FIG. 14.

FIG. 14 depicts the airfoil 212' including the spar 216 with the cover sheet 218' in a single sheet configuration (shown in dashed lines) in place. The cover sheet 218' may be coupled to the respective outer surfaces of the leading edge wall 239 and a portion of the standoffs 222 along the suction side and the pressure side. The leading outlet ports 214' may be disposed over the outlet-port internal plenum 213P'. FIG. 15 depicts the flow of cooling air delivered from the cooling air internal plenum 229 to the body section grooves 232L via the third body portion 230C of the inlet ports (with three ports/groove shown) for cooling impingement against the cover sheet 218'. The flow of cooling air then travels down the grooves 232L and exits the grooves 232L via the leading outlet ports 214'. The leading outlet ports 214' may be inclined with respect to the outer surface to direct the cool air flow toward the pressure side.

Figure 16:
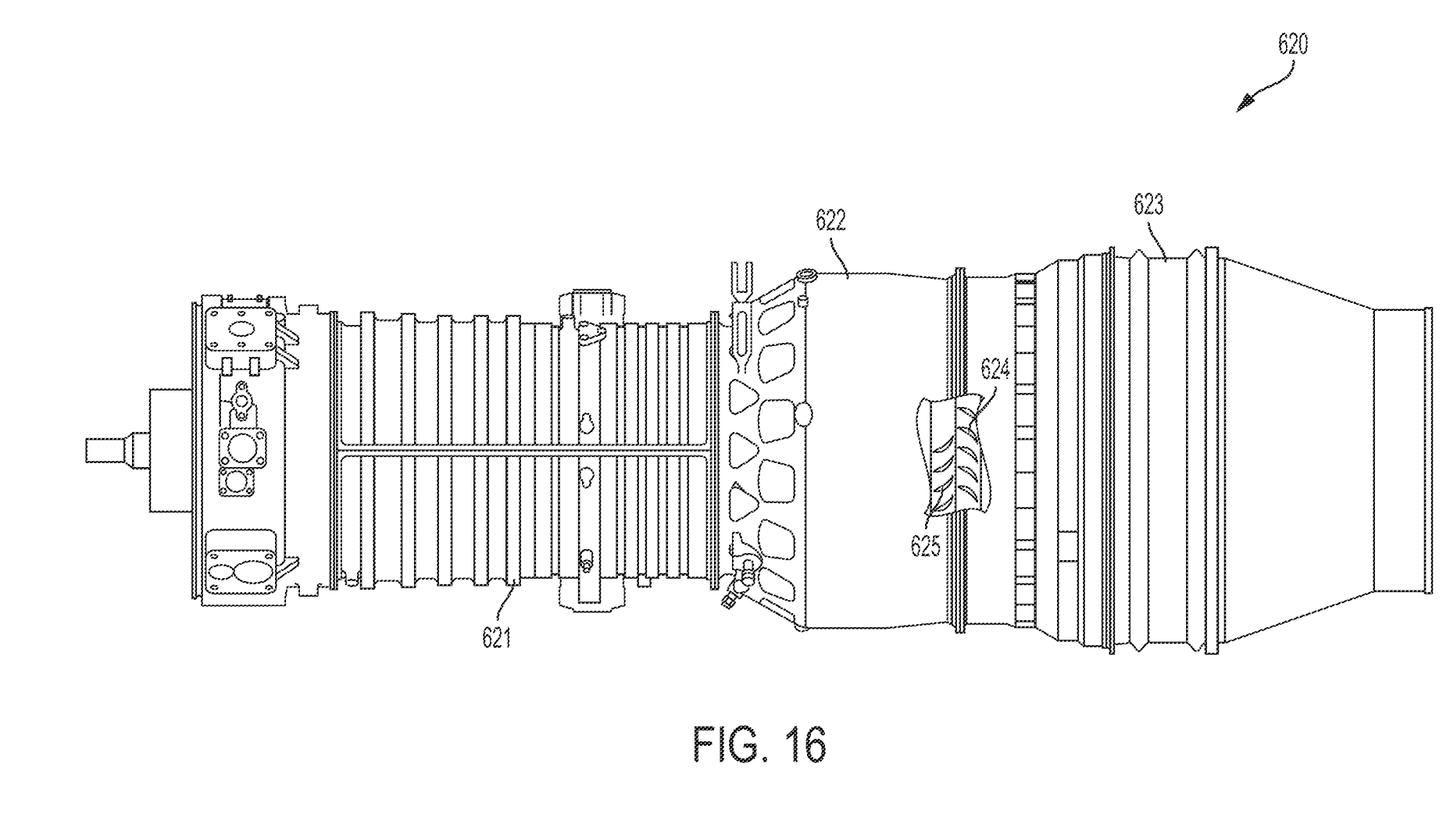
FIG. 16 depicts a gas turbine engine including an example of an airfoil.

Referring to FIG. 16, there is illustrated a gas turbine engine 620 which includes a compressor 621, a combustor 622 and a power turbine 623. The three components have been integrated together to produce an aircraft flight propulsion engine. The term aircraft is generic and includes helicopters, airplanes, missiles, unmanned space devices and any other substantially similar devices. There are a multitude of ways in which the gas turbine engine components may be linked together. Additional compressors and turbines could be added with intercoolers connecting between the compressors and reheat combustion chambers could be added between the turbines. Further, the gas turbine engine is equally suited to be used for an industrial application. Historically, there has been widespread application of industrial gas turbine engines, such as pumping sets for gas and oil transmission lines, electricity generation and naval propulsion.

A plurality of turbine blades 624 are coupled to a rotor disk that is affixed to a shaft rotatable within the gas turbine engine 620. A plurality of vanes 625 are conventionally joined together to collectively form a complete 360-degree nozzle. It is understood herein that gas turbine engine blades and vanes are often referred to as airfoils, such as the airfoils 12, 212, 212'. Other products utilizing the airfoils 12, 212, 212' are contemplated herein including but not limited to combustor liners, exhaust nozzles, exhaust liners, airframe wing leading edges, and/or other actively cooled components. The compressor 621 provides cooling air to the cooling air plenum 29 of the airfoils 12, 212, 212' through the internal engine passageway leading from the compressor to the power turbine 623, and traversing the hollow shank portion, the central conduit 13A of the inner endwall 13 and into the airfoil. The cooling air may be a compressible fluid such as air.

In one example, the airfoils 12, 212, 212' of the gas turbine engine and its components are formed of a heat resistant superalloy composition, a ceramic material, such as a ceramic-matrix composite (CMC) material, or other materials used for components. There are various types of superalloy compositions, such as but not limited to nickel based or cobalt based compositions, and the manufacturers of such compositions are generally known to those skilled in the art. Most superalloy compositions of interest are complicated mixtures of nickel, chromium, aluminum and other select elements. The airfoils 12, 212, 212' may be of a unitary cast configuration, and/or an assembly of cast components, and/or an assembly of cast and wrought components. The airfoils may have an equiax, directionally solidified or a single crystal alloy structure. In one example, the airfoil is of a cast single crystal single structure. Further, in alternate examples, the products are formed of a metallic material, or an intermetallic material or a ceramic material. In one example, the spar is formed through a casting process to form the standoffs that line the boundaries of the plurality of grooves or channels. In another example, the spar is machined to form the standoffs and the plurality of grooves or channels. In another example, the spar and the cover sheet are integrally formed with one another, with the standoffs walls and the plurality of grooves or channels formed between the spar and the coversheet. In another example, the airfoil is formed as a unitary component through a casting or 3-D printing process, for example.

The cooling passageways or cooling microchannels run below the airfoil surface to transport cooling air to one or more film outlet ports or slot at the leading edge. Impingement inlet ports may be positioned along the length of the channel. The channels shape, impingement hole location/quantity, and turbulator location/quantity may be configured to maintain the desired cooling flow rate and heat transfer over the entire length of the channel. The film outlet ports or slot may be configured to reduce the aerodynamic penalty and further reduce surface temperatures. Embedding the channels below the airfoil surface allows for higher cooling effectiveness. Coolant air enters the cooling channel and flows along the smooth surface.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

The subject-matter of the disclosure may also relate, among others, to the following aspects:

1. An airfoil for use in a gas turbine engine, the airfoil having a pressure side, a suction side, a leading edge, and a trailing edge, the airfoil comprising: a spar including a cooling air plenum disposed along an airfoil axis extending radially through the airfoil, a plurality of standoffs disposed along the pressure side of the airfoil, a leading edge wall disposed at the leading edge of the airfoil and extending away from the outer surface of the spar, and a leading separator wall extending away from the outer surface of the spar and spaced apart from the leading edge wall, the leading edge wall and the leading separator wall extending in a direction along the airfoil axis, the standoffs disposed spaced apart from another to define a plurality of grooves, the standoffs and the grooves extending in a direction transversing the leading separator wall, wherein the leading separator wall divides the grooves into a plurality of body section leading grooves and a plurality of body section trailing grooves, the body section leading grooves being closer in proximity to the leading edge than the plurality of body section trailing grooves, wherein a portion of the spar along one of the body section leading grooves defines an inlet port in communication with the cooling air plenum; and a cover sheet coupled to the leading edge wall and the standoffs over the body section leading grooves, the cover sheet comprising an outlet port at the leading edge of the airfoil that is in communication with the respective groove such that the outlet port is disposed downstream of the inlet port, wherein the inlet port is configured to deliver cooling air from the cooling air plenum to the cover sheet for impingement cooling at the cover sheet, and the outlet port is configured to allow the cooling air to exit the respective groove.

2. An airfoil for use in a gas turbine engine and having a pressure side, a suction side, a leading edge, and a trailing edge, the airfoil comprising: a spar including a cooling air plenum disposed along an airfoil axis, a plurality of standoffs disposed along a pressure side in a direction transverse to the airfoil axis, a leading edge axial wall and a leading separator axial wall extending away from an outer surface of the spar, the leading edge axial wall disposed along the leading edge separating the pressure side and the suction side of the airfoil, the leading separator axial wall spaced apart from the leading edge axial wall along the pressure side, the standoffs disposed spaced apart from another to define a plurality of pressure side transverse grooves, wherein the leading separator axial wall divides the pressure side transverse grooves into a plurality of body section leading grooves closer in proximity to the leading edge that to the trailing edge and a plurality of body section grooves closer in proximity to the trailing edge than the leading edge, wherein portions of the spar along each of the body section leading grooves define a plurality of impingement cooling ports in communication with the cooling air plenum; and a cover sheet coupled to the leading edge axial wall and the standoffs over the body section leading grooves to define a plurality of cooling channels, the cooling channels in communication with the corresponding impingement cooling ports, wherein the cover sheet is arranged to define an outlet port along the leading edge in communication with at least one of the cooling channels, the outlet port disposed downstream of the impingement cooling ports, wherein the impingement cooling ports are configured to deliver cooling air from the cooling air plenum against the cover sheet, and the outlet port is configured to discharge the cooling air from the cooling channels.

3. A gas turbine engine, comprising a compressor, a combustor, and a turbine section, wherein the turbine section includes a dual wall airfoil comprising a spar and a cover sheet, the spar including a cooling air plenum disposed along an airfoil axis, the cooling air plenum arranged to receive cooling air from the compressor, the spar including a plurality of standoffs disposed along a pressure side of the airfoil in a direction transverse to the airfoil axis, a leading edge axial wall disposed along the leading edge of the airfoil, a leading separator axial wall spaced apart from the leading edge axial wall in a direction of the pressure side, the standoffs disposed space apart from another to define a plurality of pressure side grooves, the leading separator axial wall dividing the pressure side grooves into a plurality of body section leading grooves and body section grooves, wherein the body section leading grooves are in closer proximity to the leading edge of the airfoil than the body section grooves, the cover sheet coupled to the leading edge axial wall and the standoffs over the body section leading grooves to define cooling passageways, wherein a portion of the spar along one of the cooling passageways defines at least one inlet port in communication with the cooling air plenum, wherein the cover sheet is arranged to define an outlet port in communication with the respective cooling passageway associated with the at least one inlet port, the outlet port in closer proximity to the leading edge than the at least one inlet port, wherein the at least one inlet port is operable to deliver cooling air from the cooling air plenum into the respective cooling passageway for impingement cooling at the cover sheet, and the outlet port is configured to discharge cooling air from the respective cooling passageway.

4. The airfoil of any of aspects 1 to 3, wherein ends of the standoffs are spaced from the leading edge wall to define an internal plenum that is in communication with the outlet port.

5. The airfoil of any of aspects 1 to 4, wherein the spar further comprises a plurality of suction side standoffs along the suction side, the suction side standoffs spaced apart from another to define a plurality of suction side grooves, the suction side standoffs extending in a transverse direction relative to the leading edge wall.

6. The airfoil of any of aspects 1 to 5, wherein a portion of the spar along one of the suction side grooves defines a suction side inlet port in communication with the cooling air plenum, and the cover sheet defines a suction side outlet port at the leading edge in communication with the respective groove associated with the suction side inlet port.

7. The airfoil of any of aspects 1 to 6, wherein ends of the suction side standoffs are spaced from the leading edge wall to define another internal plenum in communication with the suction side outlet port.

8. The airfoil of any of aspects 1 to 7, wherein the spar further comprises a plurality of suction side standoffs disposed along the suction side in the direction transverse to the airfoil axis, the suction side standoffs disposed axially from another to define a plurality of suction side transverse grooves to form suction side cooling channels between the suction side transverse grooves and the cover sheet.

9. The airfoil of aspect 8, wherein a portion of the spar along one of the suction side transverse grooves defines a plurality of suction side impingement cooling ports in communication with the cooling air plenum, and the cover sheet defines a suction side outlet port at the leading edge in communication with the suction side cooling channels, the leading edge axial wall being disposed between the suction side outlet port and the outlet port.

10. The airfoil of any of aspects 1 to 9, wherein the cover sheet comprises a pressure-side panel and a suction side panel.

11. The airfoil of aspect 10, wherein the pressure-side panel and the suction side panel are arranged to define the outlet port as a leading edge slot in communication with each of the cooling channels.

12. The airfoil of any of aspects 1 to 9, wherein the cover sheet is shaped to define the leading edge of the airfoil.

13. The airfoil of aspect 12, wherein the cover sheet defines a series of outlet ports along the leading edge, wherein each of the outlet ports corresponds with one of the cooling channels.

What is claimed is:

1. An airfoil for use in a gas turbine engine, the airfoil having a pressure side, a suction side, a leading edge, and a trailing edge, the airfoil comprising:
   a spar including a cooling air plenum disposed along an airfoil axis extending radially through the airfoil, a plurality of standoffs disposed along the pressure side of the airfoil, a leading edge wall disposed at the leading edge of the airfoil and extending away from the outer surface of the spar, and a leading separator wall extending away from the outer surface of the spar and spaced apart from the leading edge wall, the leading edge wall and the leading separator wall extending in a direction along the airfoil axis, the standoffs disposed spaced apart from another to define a plurality of grooves, the standoffs and the grooves extending in a direction transversing the leading separator wall, wherein the leading separator wall divides the grooves into a plurality of body section leading grooves and a plurality of body section trailing grooves, the body section leading grooves being closer in proximity to the leading edge than the plurality of body section trailing grooves, wherein a portion of the spar along one of the body section leading grooves defines an inlet port in communication with the cooling air plenum, the inlet port being disposed between the leading edge wall and the leading separator wall; and
   a cover sheet comprising a suction-side panel and a pressure-side panel, the suction side panel comprising an outer surface and an inner surface opposite the outer surface of the suction side panel, the inner surface of the suction-side panel coupled to the leading edge wall, the pressure-side panel comprising an outer surface and an inner surface opposite the outer surface of the pressure-side panel, the inner surface of the pressure-side panel coupled to the leading separator wall and the standoffs over the body section leading grooves,
   wherein the suction side panel and the pressure side panel define an outlet slot at a stagnation point of the leading edge of the airfoil that is in communication with the body section leading grooves, the outlet slot being closer in proximity to the leading edge wall than the inlet port and the inlet port being closer in proximity to the leading separator wall than the outlet slot-such that the outlet slot is disposed downstream of the inlet port,
   wherein the stagnation point is an area exposed to the highest gas pressure and the highest thermal loads exerted against the airfoil, and
   wherein the inlet port is configured to deliver cooling air from the cooling air plenum to the cover sheet for impingement cooling on an inner surface of the cover sheet, and the outlet slot is configured to allow the cooling air to exit the body section leading grooves at the stagnation point to film cool the airfoil.

2. The airfoil of claim 1, wherein the cover sheet is shaped to define the leading edge of the airfoil.

3. The airfoil of claim 1, wherein ends of the standoffs are spaced from the leading edge wall to define an internal plenum that is in communication with the outlet slot.

4. The airfoil of claim 3, wherein the spar further comprises a plurality of suction side standoffs along the suction side, the suction side standoffs spaced apart from another to define a plurality of suction side grooves, the suction side standoffs extending in a transverse direction relative to the leading edge wall.

5. The airfoil of claim 4, wherein a portion of the spar along one of the suction side grooves defines a suction side inlet port in communication with the cooling air plenum, and the cover sheet defines a suction side outlet port at the leading edge in communication with the respective groove associated with the suction side inlet port.

6. The airfoil of claim 5, wherein ends of the suction side standoffs are spaced from the leading edge wall to define another internal plenum in communication with the suction side outlet port.

7. An airfoil for use in a gas turbine engine and having a pressure side, a suction side, a leading edge, and a trailing edge, the airfoil comprising:
   a spar including a cooling air plenum disposed along an airfoil axis, a plurality of standoffs disposed along a pressure side in a direction transverse to the airfoil axis, a leading edge axial wall and a leading separator axial wall extending away from an outer surface of the spar, the leading edge axial wall disposed along the leading edge separating the pressure side and the suction side of the airfoil, the leading separator axial wall spaced apart from the leading edge axial wall along the pressure side, the standoffs disposed spaced apart from another to define a plurality of pressure side transverse grooves, wherein the leading separator axial wall divides the pressure side transverse grooves into a plurality of body section leading grooves closer in proximity to the leading edge that to the trailing edge and a plurality of body section grooves closer in proximity to the trailing edge than the leading edge, wherein portions of the spar along each of the body section leading grooves define a plurality of impingement cooling ports in communication with the cooling air plenum;
   a pressure side cover sheet comprising an inner surface and an outer surface opposite the inner surface of the pressure side cover sheet, the inner surface of the pressure side cover sheet coupled to the standoffs over the body section leading grooves to define a plurality of cooling channels, the cooling channels in communication with the corresponding impingement cooling ports; and
   a suction side cover sheet comprising an inner surface and an outer surface opposite the inner surface of the suction side cover sheet, the inner surface coupled to the leading edge axial wall,
   wherein the suction side cover sheet and the pressure side covers sheet are arranged to define an outlet slot between the suction side cover sheet and the pressure side cover sheet, the outlet slot extending along a stagnation point of the leading edge, the outlet slot in communication with at least one of the cooling channels and disposed downstream of the impingement cooling ports, wherein the impingement cooling ports are configured to deliver cooling air from the cooling air plenum against the inner surface of the pressure side cover sheet and into the cooling channels, and the outlet slot is configured to discharge the cooling air from the cooling channels for film cooling on the airfoil.

8. The airfoil of claim 7, wherein the spar further comprises a plurality of suction side standoffs disposed along the suction side in the direction transverse to the airfoil axis, the suction side standoffs disposed axially from another to define a plurality of suction side transverse grooves to form suction side cooling channels between the suction side transverse grooves and the suction side cover sheet.

9. The airfoil of claim 8, wherein a portion of the spar along one of the suction side transverse grooves defines a plurality of suction side impingement cooling ports in communication with the cooling air plenum, and the suction side cover sheet defines a suction side outlet port in communication with the suction side cooling channels, the leading edge axial wall being disposed between the suction side outlet port and the outlet slot.

10. The airfoil of claim 7, wherein ends of the standoffs are spaced from the leading edge axial wall to define an internal plenum in communication with the outlet slot.

11. A gas turbine engine, comprising a compressor, a combustor, and a turbine section, wherein the turbine section includes a dual wall airfoil comprising a spar and a cover sheet, the spar including a cooling air plenum disposed along an airfoil axis, the cooling air plenum arranged to receive cooling air from the compressor, the spar including a plurality of standoffs disposed along a pressure side of the airfoil in a direction transverse to the airfoil axis, a leading edge axial wall disposed along the leading edge of the airfoil, a leading separator axial wall spaced apart from the leading edge axial wall in a direction of the pressure side, the standoffs spaced apart from another to define a plurality of pressure side grooves, the leading separator axial wall dividing the pressure side grooves into a plurality of body section leading grooves and body section grooves, wherein the body section leading grooves are in closer proximity to the leading edge of the airfoil than the body section grooves, the cover sheet comprising an inner surface and an outer surface opposite the inner surface, the inner surface coupled to the leading edge axial wall, the leading separator axial wall, and the standoffs over the body section leading grooves to define cooling passageways between the leading edge axial wall and the leading separator axial wall, wherein a portion of the spar along one of the cooling passageways defines at least one inlet port in communication with the cooling air plenum, wherein the cover sheet is arranged to define an outlet slot extending an entire length of the coversheet, the outlet slot in communication with the cooling passageways, the outlet slot in closer proximity to the leading edge axial wall than the at least one inlet port, wherein the outlet slot is positioned at a stagnation point of the leading edge, wherein the inlet ports are operable to deliver cooling air from the cooling air plenum into the cooling passageways, respectively, for impingement cooling at the cover sheet, and the outlet slot is configured to discharge cooling air received from the cooling passageways.

12. The gas turbine engine of claim 11, wherein the cover sheet of the airfoil comprises a pressure-side panel and a suction side panel, wherein the pressure-side panel and the suction side panel are arranged to define the outlet slot in a leading edge slot configuration.

* * * * *